J. VOLPE.
SHOCK ELIMINATOR FOR VEHICLE SPRINGS.
APPLICATION FILED MAR. 12, 1915.
1,319,736.
Patented Oct. 28, 1919.
2 SHEETS—SHEET 1.
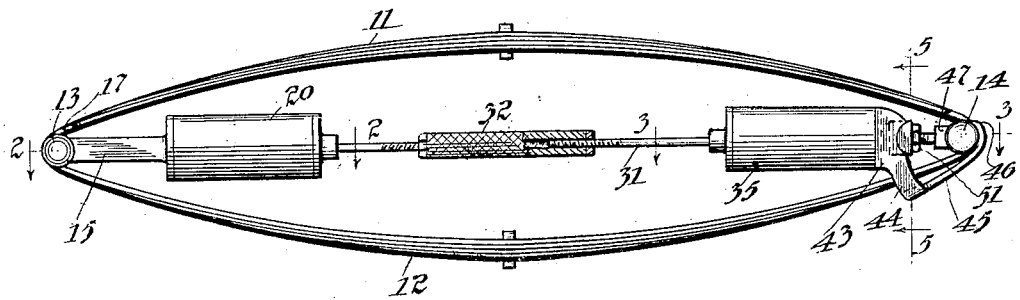

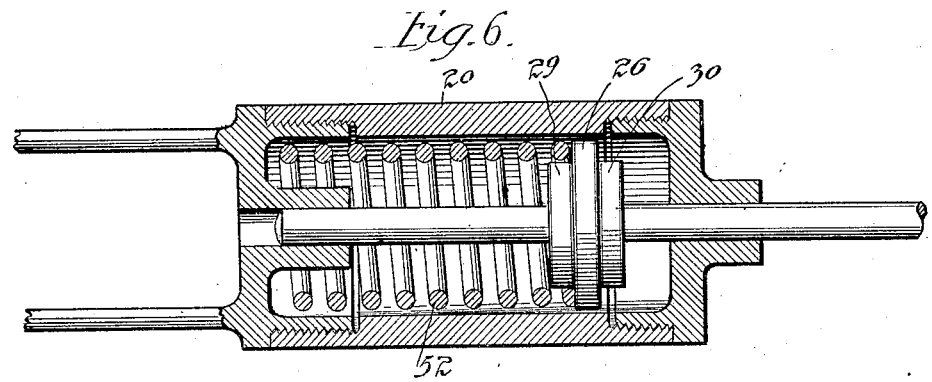
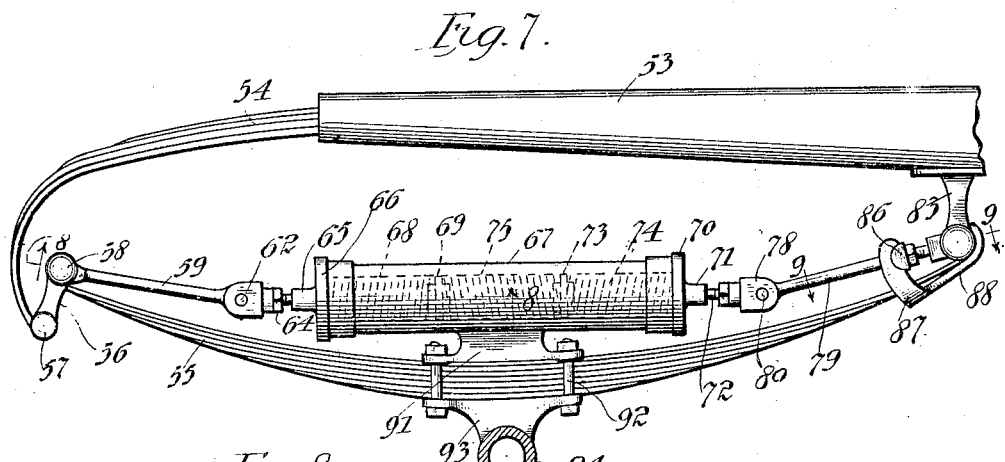
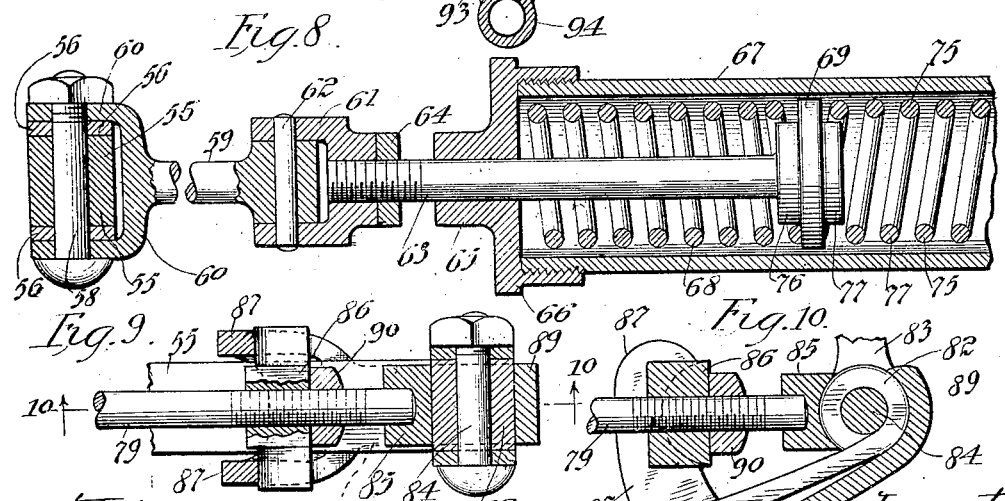

UNITED STATES PATENT OFFICE.

JOSEPH VOLPE, OF CHICAGO, ILLINOIS.

SHOCK-ELIMINATOR FOR VEHICLE-SPRINGS.

1,319,736.      Specification of Letters Patent.      Patented Oct. 28, 1919.

Application filed March 12, 1915. Serial No. 13,991.

*To all whom it may concern:*

Be it known that I, JOSEPH VOLPE, a subject of Italy, and a resident of Chicago, in the county of Cook and State of Illinois, have invented certain new and useful Improvements in Shock-Eliminators for Vehicle-Springs, of which the following is a full, clear, and exact specification.

This invention relates to improvements in shock eliminators for vehicle springs, and particularly for those employed in automobiles consisting of opposing reversely curved leaf springs.

The object of my invention is to utilize the advantage due to the quicker action of coil springs as compared with the slower action of leaf springs for vehicles for absorbing shocks imparted to the latter, and thereby increasing the efficiency and durability of leaf springs and at the same time substantially promote the comfort of the occupant of the vehicle and particularly automobiles in which leaf springs are commonly interposed between their body and running gear.

Another object of my invention is a shock absorber for vehicle springs of the elliptical type adapted to resist the compression of the springs to a breaking point, and whereby the durability of the spring is correspondingly prolonged.

Another object of my invention is to provide a simple and convenient means for adjusting the coil springs of a shock eliminator for loss of tension from use.

Another object of my invention is a shock absorber the construction of which is such that it may be conveniently and quickly secured to a variety of leaf springs before installed and used in their operative position in automobiles and other vehicles, and as quickly and conveniently detached therefrom for any purpose when desired.

With these ends in view, my invention finds embodiment in certain features of novelty in the construction, combination, and arrangement of parts by which said objects and certain other objects are attained, all as hereinafter fully described, with reference to the accompanying drawings and more fully pointed out in the claims.

In said drawings:

Figure 1 illustrates a front elevation of a shock absorber in which my invention finds embodiment, secured in its operative position to the springs for a vehicle.

Fig. 2 is an enlarged detail longitudinal section taken on the line 2—2 of Fig. 1.

Fig. 3 is a detail section taken on the line 3—3 of Fig. 1.

Fig. 4 is a detail side elevation of one end of the shock absorber shown in Fig. 3.

Fig. 5 is a transverse section on the line 5—5 of Fig. 1 broken away in part.

Fig. 6 is a longitudinal section through a modification of the shock absorber shown in Figs. 2 and 3.

Fig. 7 is a front elevation of another modified form of a shock absorber in which my invention finds embodiment.

Fig. 8 is an enlarged longitudinal section taken on the line 8—8 of Fig. 7.

Fig. 9 is a longitudinal section taken on the line 9—9 of Fig. 7, and—

Fig. 10 is a longitudinal detail section taken on the line 10—10 of Fig. 9.

Similar characters of reference indicate the same parts in the several figures of the drawings.

Referring to Figs. 1 to 5 inclusive, of the drawings, 11 and 12 indicate opposing, reversely curved leaf springs connected at their respective meeting ends by pivoting bolts 13 and 14, to which the shock eliminator containing my invention is shown to be attached in its operative position at one end by means of a pair of arms 15—15, both of which are provided with perforations 16, through which and through the bent ends of the springs the bolt 13 passes, the end of the spring 11 being slotted as shown at 17 Fig. 4, to provide lugs between which the opposing bent end of the spring 12 is secured.

The opposite ends of the arms are secured to a head block 18, screw-threaded, as indicated at 19, to fit one end of a tubular casing 20, and is provided with an inwardly projecting hub 21 longitudinally provided with a perforation 22, the other end of the tubular casing being closed by means of a cap 23 longitudinally perforated, as indicated at 24.

The perforations 22 and 24 provide bearings for a plunger rod 25 on which is a plunger disk 26 loosely fitting the interior walls of the casing 20 and adapted to be reciprocated back and forth therein.

On one side of the plunger is a coil spring 27, one end of which abuts against the screw cap 18, and the other end against the opposing side of the plunger 26.

Abutting against the cap 23 is another coil spring 28, one end of which abuts against the screw cap 23, and the other end against the side of the opposing face of the plunger 26, the ends of which springs 27 and 28 are coiled about shoulders 29 and 30 respectively at the opposite sides of the plunger, and which with the plunger may be formed integral with the plunger rod 25.

The plunger rod 25 projects outwardly beyond the casing and is connected with a plunger rod 31 by means of a right and a left hand screw-threaded, tubular coupling 32, the bearings of which coupling are in the hub 33 of a cap 34 screw-threaded into a casing 35, the opposite end of the plunger rod 31 being extended to and bearing in a hub 36 of a cap 36ᵃ, screw-threaded as indicated at 37, in the opposite end of the casing 35.

The rod 31, like the rod 25, is provided with a plunger 38 against which the face of one end of the spring 39 abuts, and its opposite end against the cap 34.

On the opposite side of the plunger 38 is another coil spring 40, one end of which bears against the face of the plunger 38 and the other end against the cap 36ᵃ, the opposing ends of the two springs being coiled around shoulders 41 and 42, respectively, at the opposite sides of the plunger 38, and which together with the plunger may be formed integral with rod 31.

Cast with, or otherwise secured to the face of the cap 36ᵃ is a clip 43 having arms 44—44 at each side thereof which are adapted to straddle and project below the lower spring 12. The depending ends of said arms converge inwardly toward each other, and terminate in a flat plate 45 bent at its outer end to form a hook 46, passing under and partly over the adjacent bent end of the spring 12, and held against accidental detachment by means of a block 47, grooved to conform to the adjacent curved surface of the end of the spring 12, to which block is secured a screw-threaded bolt 48 free to turn in a bar 49, provided with semi-circular ends 50—50 having their bearing in corresponding notches in the edges of the arms 44, the bar 49 being adjustable in the arms 44 by means of a nut 51, on the bolt 48.

With the spring containing casings connected in the above described manner and with the end of the spring 12 bent about the bolt 14, a means is provided not only for the quick attachment and detachment of the shock eliminator but for so suspending the opposing casings and their springs as to direct and maintain their line of force through the axis of both springs, and their couplings, notwithstanding their pivotal connection at their opposite ends with the meeting ends of reversely curved springs.

Instead of using opposing springs in both casings as previously described, a single spring 52 may be substituted therefor, as indicated in Fig. 6 without a substantial departure from the spirit of my invention, and in which case, the casing, its caps and means of connection with the vehicle springs are substantially the same as those shown in Fig. 1.

It will now be observed that by screw-threading the caps into their respective casings, as shown in Figs. 2, 3 and 6, a convenient means is provided for adjusting the tension of the springs and also for taking up wear, this being the case whether there are either one or two springs contained in the casing.

In Figs. 7 to 10 inclusive, is illustrated a modified form of my invention adapted for use in connection with what is commonly known as a "three-quarter" elliptical vehicle spring. In this modification there is commonly employed a bar 53, connecting the opposing ends of the short upper springs 54, and supporting them in their operative position and a continuous lower spring 55 is connected with their free ends as usual, by means of a shackle, consisting of a link 56 connected with the springs 54 by a bolt 57, passing through the link and through the eye (not shown) formed in the end of the spring 54.

The opposite end of the link is projected through the coiled slotted ends of the spring 55 in the usual manner, and pivoted thereto by means of a bolt 58.

Also pivoted on the bolt 58 is a bifurcated connecting rod 59, the arms 60—60 of which project between the outer edges of the spring 55 and the head and nut of the bolt, the opposite end of said connecting rod projects into a slotted coupling 61, and is hinged thereto by a pin 62.

Coupling 61 is screw-threaded on the end of a plunger rod 63, and is locked in its adjustment by means of a nut 64.

The bearing of the plunger rod 63 is a hub 65 integral with a cap 66, screw-threaded on a cylindrical casing 67, inclosing a coiled spring 68, one end of which bears against the cap 66, and its opposite end against the plunger 69 on the plunger rod 63.

The opposite end of the casing 67 is closed by a cap 70 screw-threaded thereon having a hub 71 forming the bearing for another plunger rod 72, which (see dotted lines Fig. 1) has on the end thereof a plunger 73 identically like the plunger 69, abutting against said plunger 73 and the cap 70 is a coiled spring 74, and between said plunger 73 and the plunger 69 is a third coiled spring 75, the adjacent free ends of said three springs are coiled about shoulders 76 and 77 at opposite sides of each of the plungers 69 and 73.

Adjustable on the outer end of the plunger rod 72 is a coupling 78 to which is pivoted a connecting rod 79, by means of a pin 80, with its opposite end projecting into a block 85, bearing against and grooved to conform to the surface of the eye 82, through which, and through the depending end of a hanger 83 secured to the side bar 53 passes a bolt 84 pivotally suspending the spring from the side bar 53.

Conforming to and bearing against the eye 82 is a block 85 on the end of the connecting rod 79 which is screw-threaded into a cross-bar 86, the ends of which are semicircular, and have their bearings in corresponding recesses in the ears 87 at opposite sides of the spring 55 secured to and preferably cast with and forming a part of a clip plate 88 provided with a hook 89 opposing the block 85 and passing partly around the eye 82 of the spring.

With the above described construction, the clip plate is longitudinally adjustable on the shaft, and may be locked in its adjustment by the nut 90, while at the same time the cross bar may have a rocking movement, and the connecting rod 79 a vibrating movement in the ears of the clip plate, and which by being pivotally connected with the coupling 78 provides for the reciprocation of the plunger rods in a straight line with the compression and expansion of the springs in the casing 67, while the adjustment of the connecting rod provides a means for adjusting the block with reference to the looseness or tightness of its bearing against the end of the spring 55.

As shown in Fig. 7 the casing 67 may be secured to and seated upon the upper clip plate 91 secured by bolts 92 with the lower clip plate 93 provided with a hub 94, and by means of which the springs are held upon the axle of the vehicle to which they are applied, instead of being suspended from the ends of the springs, as shown in Fig. 1.

The purpose of my shock eliminator is to yieldingly resist the lengthening of elliptical springs from compression with substantially increasing resistance as the lengthening of the springs continues, and which in light vehicles may be accomplished by the use of a coiled single spring, such as is shown in Fig. 6, and which may be successfully accomplished with full elliptical springs for heavier vehicles, by the employment of two pairs of coiled springs, with the springs of each pair opposing each other, as shown in Fig. 1.

But for three-quarter elliptical springs it is preferable to employ for each pair three coiled springs in the arrangement shown in Fig. 7, and which in both instances when arranged as shown in the drawings not only eliminates shocks to which both forms of said springs are frequently subjected and particularly when used in automobiles, but which furnish a means preventing both the upper and lower elliptical springs from being bent to a breaking point.

It will now be observed that the shock eliminator of my invention may be quickly assembled with both full elliptical and three-quarter elliptical springs of ordinary and commonly used construction, such as are shown in Figs. 1 and 7, and in both constructions on removing but one of the two bolts at the opposite ends of the springs, followed by replacing the bolt and tightening it after introducing the arms 15 of Fig. 1 and the rod 59 of Fig. 7 as may be, in their operative position with reference to the adjacent ends of the spring, followed by introducing the hook of the clip at the opposite end of the springs and spring over the retaining bolt therefor, and then tightening the hook opposing block by turning the nut sufficiently to maintain the hook in its operative position, and yet loose enough for the block and hook to oscillate on their bearing, and which is done by screwing the lock bolt against its opposing pivoted crossbars.

For detaching the shock eliminator, it is only necessary to unscrew the adjusting lock nut sufficiently to release the hook, and thereafter remove the connecting bolt for and at the opposite end of the springs.

The casings with their caps, screw-threaded as they are, provide not only bearings for the plunger rods, and for preventing access of dust and other foreign matter to the springs, but a means for adjusting the springs for loss in tension from prolonged use, but my invention is not to be limited to the use of such casings and caps, when obviously the springs are operative for their purpose when not so inclosed and protected.

For light vehicles the use of a single spring, as shown in Fig. 6 will be sufficient for substantially reducing shocks imparted when employing either full elliptical or three-quarter elliptical springs, but for the heavier type of vehicles, as for example automobiles, opposing springs are preferably employed to cushion the interposed plungers at opposite sides thereof, and in some instances, and particularly for three-quarter springs used in automobiles, it is preferred to use three coiled springs with one interposed between the opposing ends of the plungers.

My invention broadly includes the employment of one or more coiled springs, which on being connected with and suspended between the end bearing pivots of elliptical springs will resist the elongation of said springs under compression, and absorb shocks imparted thereto, and is therefore not limited to the details of construction herein shown and described, wherein coiled springs are employed for the same purpose, or produce substantially the same result.

Having described my invention, what I claim and desire to secure by Letters Patent is:

1. A shock eliminator for vehicles, comprising in combination, a semi-elliptical spring, a pivot for the end of said spring, a coiled spring, a fixed and movable abutment for the ends of said coil spring, a rod for the movable abutment passing through the coiled spring and connected with the pivot of the semi-elliptical spring and a flexible connection between said pivot and rod, the axis of which connection is parallel to the axis of the pivot for the semi-elliptical spring.

2. A shock eliminator for vehicles comprising in combination opposing semi-elliptical springs, a pivot connecting the adjacent ends thereof, coiled springs, fixed abutments for the outer ends of the coiled springs, a movable abutment located between the inner ends thereof, and means passing through the coiled springs for connecting the movable abutment with the pivoted ends of the semi-elliptical springs.

3. A shock eliminator for vehicles comprising in combination a pair of semi-elliptical springs, pivots connecting the opposite ends of said springs, a plurality of coiled springs, a plunger interposed between and in fixed contact with the adjacent ends of said springs, abutments for the outer ends thereof, and means for connecting said abutments and plunger, respectively, with the opposite ends of such semi-elliptical springs.

4. A shock eliminator for vehicles, comprising in combination, opposing semi-elliptical springs, pivots respectively connecting the opposing ends of said springs, a plurality of coil springs located between the opposed ends of the semi-elliptical springs, a plunger interposed between the ends of adjacent coiled springs and means for flexibly connecting the plunger with the pivots for the ends of the semi-elliptical springs.

5. A shock eliminator for vehicles, comprising in combination, a plurality of coil springs, a fixed abutment for the outward end of each of said springs, a movable abutment located between their opposing ends, semi-elliptical springs, a pivot connecting the ends thereof, and means suspended between the fixed abutment and the ends of the semi-elliptical springs for flexibly connecting the movable abutment with the pivots of the semi-elliptical springs.

6. A shock eliminator for vehicles, comprising in combination opposing semi-elliptical springs, pivot bolts connecting the ends thereof, opposing coiled springs, a reciprocating plunger separating the opposing ends of said springs, and an inclosing casing therefor provided with perforations forming bearings at opposite ends thereof for said plunger.

7. A shock eliminator for vehicles comprising in combination opposing semi-elliptical springs, pivot bolts connecting the ends thereof, a plurality of coiled springs adjacent the opposite ends of said semi-elliptical springs, a casing for each pair of coiled springs, a bar projecting from one of said casings pivotally supported upon the bolt connecting the ends of the semi-elliptical springs, the other casing being provided with a hook suspended from the opposite ends of the elliptical springs, plungers interposed between the opposing ends of each pair of springs, a rod for each plunger, and a right and left hand coupling connecting said rods at a point between said casings.

8. A shock eliminator for vehicles, comprising in combination semi-elliptical springs, a coiled spring, a casing inclosing said coiled spring, a clip plate provided with a hook adapted to engage and connect said casing with the jointed ends of the semi-elliptical springs, a head-block opposing said hook portion and bearing against said semi-elliptical springs, a pivoted cross-bar, a screw-bolt secured to said block and projecting through said bar, and a lock nut thereon whereby the block is adjusted toward and from said hook.

9. The combination with the chassis, axle, and main spring of an automobile, of a shock absorber, the latter comprising a spring chamber rigidly attached to the axle, springs within said chamber, plungers for compressing said springs, oppositely extended rods for actuating said plungers, and means for connecting the ends of said rods to portions of the main spring whereby, upon relative approach of the chassis and axle, the rods will be pulled apart, and upon relative separation from normal position of the chassis and axle, the rods will be forced toward each other.

10. In a shock absorber of the character described, the combination with a spring container, of a spring within said container, a plunger within the container for compressing said spring, a connecting rod operatively attached to the plunger, and means for attaching the free end of said rod to the main spring or other part of a vehicle, said means including a clip bent into hook shape at one end and forked at its other end, the forked end being pivotally connected to the end of said rod and the hook shaped end of the clip fitting over the spring or other portion of the vehicle.

11. A shock absorber of the character described, comprising, a spring controlled plunger, a rod for actuating said plunger and means for connecting the outer end of said rod to the main spring or other suitable portion of a vehicle, said means including an adjustably threaded nut mounted on the end of said rod, and a clip pivotally attached to said nut, said clip having a hook shaped end adapted to fit over a main spring end or other suitable portion of the vehicle.

12. The combination with a shock absorber, including a spring and a plunger for compressing the spring, of a connecting rod attached to the plunger, and means for attaching the free end of said rod to the spring or other portion of a vehicle, said means including a hook-shaped member adapted to fit over the end of said spring or other portion of the vehicle, said hook-shaped member being pivotally connected to said free end of the rod.

In witness whereof, I have hereunto set my hand and affixed my seal, this 9th day of March, A. D. 1915.

JOSEPH VOLPE. [L. S.]

Witnesses:
MILDRED ELSNER,
JNO. G. ELLIOTT.